(12) United States Patent
Wang et al.

(10) Patent No.: US 6,868,036 B2
(45) Date of Patent: Mar. 15, 2005

(54) OIL WELL ACOUSTIC LOGGING TOOL WITH BAFFLES FORMING AN ACOUSTIC WAVEGUIDE

(75) Inventors: Canyun Wang, Norwalk, CT (US); Jahir Pabon, Brookfield, CT (US)

(73) Assignee: Schlumberger Technology Corporation, Ridgefield, CT (US)

(*) Notice: Subject to any disclaimer, the term of this patent is extended or adjusted under 35 U.S.C. 154(b) by 284 days.

(21) Appl. No.: 10/290,617

(22) Filed: Nov. 8, 2002

(65) Prior Publication Data

US 2004/0090863 A1 May 13, 2004

(51) Int. Cl.⁷ .................................................. G01V 1/00
(52) U.S. Cl. ........................... 367/25; 367/31; 367/137; 367/911; 181/104; 181/108; 181/113
(58) Field of Search .............................. 367/25, 31, 911

(56) References Cited

U.S. PATENT DOCUMENTS

| | | | | |
|---|---|---|---|---|
| 4,415,998 A | * | 11/1983 | Blizard ........................ 367/25 |
| 5,036,945 A | | 8/1991 | Hoyle et al. ................. 181/104 |
| 5,510,582 A | * | 4/1996 | Birchak et al. .............. 181/102 |
| 5,731,550 A | * | 3/1998 | Lester et al. ................. 181/102 |
| 5,936,913 A | * | 8/1999 | Gill et al. ..................... 367/25 |

FOREIGN PATENT DOCUMENTS

| | | | |
|---|---|---|---|
| WO | WO 01/73478 A2 | 10/2001 | |
| WO | WO 01/73478 A2 * | 10/2001 | ............ G01V/1/52 |
| WO | WO 02/41034 A1 | 5/2002 | |

OTHER PUBLICATIONS

"Geophysical Prospecting Using Sonics and Ultrasonics". *Wiley Encyclopedia of Electrical and Electronic Engineering*, pp. 340–365 (1999).

* cited by examiner

Primary Examiner—Thomas H. Tarcza
Assistant Examiner—Scott A. Hughes
(74) Attorney, Agent, or Firm—John L. Lee; William B. Batzer; Dale Gaudier

(57) ABSTRACT

An acoustic logging tool includes external baffle assemblies forming a waveguide structure at the acoustic source. The logging tool is designed for acoustic logging of earth formation surrounding a borehole. The external baffle assemblies form a waveguide structure that is designed to increase signal to noise ratio in an acoustic logging tool using dipole or other acoustic waves. In a preferred embodiment, the acoustic logging tool includes an elongated transmitter module, and a receiver sonde having a linear array of acoustic receivers. The transmitter module includes first and second cylindrical masses spaced apart along the axis by first and second spacers. The first cylindrical mass defines a first circular facing surface and a first cylindrical outer surface. The second cylindrical mass defines a second circular facing surface and a second cylindrical outer surface. A multi-pole acoustic source is fixedly mounted between the first and second circular facing surfaces, and located on the transmitter module axis between the first and second spacers. A first annular baffle assembly surrounding the first cylindrical outer surface has a first annular facing surface co-planar with the first circular facing surface. A second annular baffle assembly surrounding the second cylindrical outer surface has a second annular facing surface co-planar with the second circular facing surface. The annular baffle assemblies form an acoustic waveguide.

18 Claims, 14 Drawing Sheets

OIL WELL ACOUSTIC LOGGING TOOL WITH BAFFLES FORMING AN ACOUSTIC WAVEGUIDE

This application is related to co-owned U.S. Pat. No. 5,036,945 to Hoyle et al.; to co-owned U.S. Pat. No. 5,796,677 to Kostek et al.; to co-owned international patent application no. PCT/IB01/00447, filed 21 Mar. 2001, published 4 Oct. 2001 as international publication no. WO 01/73478 A2, which claims priority to co-owned, co-pending U.S. application Ser. No. 09/537,836, filed 29 Mar. 2000; and to co-owned, co-pending international patent application no. PCT/IB00/01696, filed 16 Nov. 2000, published 23 May 2002, as international publication no. WO 02/41034 A1.

FIELD OF THE INVENTION

The invention relates to acoustic logging in oilfield geological formations. More particularly, the invention relates to apparatus and methods for increasing the signal to noise ratio in logging tools that use dipole or other acoustic signals.

BACKGROUND OF THE INVENTION

The field of sonic logging of boreholes in the oil and gas industry involves making acoustic measurements in the borehole at frequencies typically in the range 500 Hz–20 kHz. Below this range is typically considered as the seismic domain, above it the ultrasonic domain. A summary of the general techniques involved in borehole acoustic logging can be found in GEOPHYSICAL PROSPECTING USING SONICS AND ULTRASONICS, Wiley Encyclopedia of Electrical and Electronic Engineering 1999, pp, 340–365.

In certain well-bores, measurement of acoustic dipole signal can be difficult. This problem is nontrivial because acoustic source design is constrained by the limited space within the tool body and by the limit in power supply.

Schlumberger Technology Corporation, the assignee of this application, has provided a commercially successful acoustic logging tool, the Dipole Sonic Imaging Tool (DSI), that delays and attenuates acoustic waves propagating along the tool from the dipole source to the receiver array. The Schlumberger DSI tool attenuates acoustic waves in a manner substantially as set forth in the above-mentioned co-owned U.S. Pat. No. 5,036,945 to Hoyle et al.

The Schlumberger DSI tool is shown in schematic form in FIG. 1 (prior art). FIG. 1 (prior art) shows the DSI tool comprising a transmitter section 102 having a pair of (upper and lower) dipole sources 103 arranged orthogonally in the radial plane and a monopole source 104. A sonic isolation joint 105 connects the transmitter section 102 to a receiver section 106 which contains an array of eight spaced receiver stations, each containing two hydrophone pairs, one pair oriented in line with a lower dipole source, the other with an upper (orthogonal) dipole source. An electronics cartridge 107 is connected at the top of the receiver section 106 and allows communication between the tool and a control unit 108 located at the surface via an electric cable 109. With such a tool it is possible to make both monopole and dipole measurements. The DSI tool has several data acquisition operating modes, any of which may be combined to acquire waveforms. The modes are: upper and lower dipole modes (UDP, LDP)-waveforms, recorded from receiver pairs aligned with the respective upper and lower dipole source used to generate the signal; crossed dipole mode waveforms recorded from each receiver pair for firings of the in-line and crossed dipole source; Stoneley mode—monopole waveforms from low frequency firing of the monopole source; P and S mode (P&S) monopole waveforms from high frequency firing of the monopole source; and first motion mode—monopole threshold crossing data from high frequency firing of the monopole source.

A first advance by Schlumberger on the DSI tool increases the signal to noise ratio in a logging tool using dipole signals by shaking part of the dipole tool body axially to produce a pure, broadband acoustic dipole signal while coupling as little energy as possible into the rest of the tool body. The use of dipole signals made by shaking (axially) all or part of the dipole tool is disclosed in the above-mentioned co-pending U.S. application Ser. No. 09/537,836, filed 29 Mar. 2000. As noted above, co-owned international patent application no. PCT/IB01/00447, filed 21 Mar. 2001, claims priority to co-owned, co-pending U.S. application Ser. No. 09/537,836, filed 29 Mar. 2000, and was published 4 Oct. 2001 as international publication no. WO 01/73478 A2.

A second advance by Schlumberger on the DSI tool increases the signal to noise ratio in a logging tool using dipole signals by attaching regularly spaced mass blocks to the central mandrel within the spacer section and the receiver section of the dipole tool body. This causes the spacer section and the receiver section to behave acoustically like a mass-spring structure which does not interfere with the acoustic signals used for evaluation of the formation surrounding the borehole, while still providing suitable physical structure and support for the other parts of the tool. The use of regularly spaced mass blocks is disclosed in the above-mentioned co-owned, co-pending international patent application no. PCT/IB00/01696, filed 16 Nov. 2000, published 23 May 2002, as international publication no. WO 02/41034 A1.

SUMMARY OF THE INVENTION

The invention provides an acoustic logging tool having external baffles forming a waveguide structure designed to increase signal to noise ratio. The tool is designed for acoustic logging of earth formation surrounding a borehole. The tool includes a transmitter module with first and second masses axially-aligned and bracketing a multi-pole acoustic source between circular facing surfaces. The acoustic waveguide includes first and second annular baffle assemblies encircling the first and second masses, respectively. First and second baffle assemblies define first and second annular facing surfaces co-planar with the first and second circular facing surfaces.

In a preferred embodiment, the acoustic logging tool includes an elongated transmitter module defining a transmitter module axis, and a receiver sonde having a linear array of acoustic receivers. The receiver sonde is coupled to, and spaced apart from, the transmitter module. The transmitter module includes first and second cylindrical masses spaced apart along the axis by first and second spacers. The first cylindrical mass defines a first circular facing surface and a first cylindrical outer surface. The second cylindrical mass defines a second circular facing surface and a second cylindrical outer surface. A multi-pole acoustic source is fixedly mounted between the first and second circular facing surfaces, and located on the axis between the first and second spacers. A first annular baffle assembly surrounding the outer surface has a first annular facing surface co-planar with the first circular facing surface. A second annular baffle assembly surrounding the outer surface has a second annular facing surface co-planar with the second circular facing surface. The annular baffle assemblies form an acoustic waveguide. Preferably, the annular baffle assemblies each include a baffle having a cylindrical outer surface and a protective ring, and the protective ring has a shaped surface with an approximately conical cross section. Preferably, the acoustic source is a dipole source. Preferably, the linear array of acoustic receivers is mounted to a linear array of mass blocks.

Alternatively, at least one of the annular baffle assemblies is just a baffle. Alternatively, at least one of said annular baffle assemblies is elongated in a direction transverse to the tool axis. Alternatively, the multi-pole acoustic source is a quadrupole

DETAILED DESCRIPTION OF THE INVENTION

The invention provides a novel acoustic logging tool having external baffles forming a waveguide structure at the acoustic source. The waveguide structure increases the signal to noise ratio in an acoustic logging tool by increasing the received amplitude of dipole flexural mode acoustic waves. This can increase the signal to noise ratio by up to at least a factor of six. Increasing signal to noise ratio is achieved without modifying the acoustic source or increasing power to the acoustic source. This novel acoustic logging tool makes it possible to perform acoustic logging in certain well-bores in which acoustic logging is not currently possible.

Figure 1:
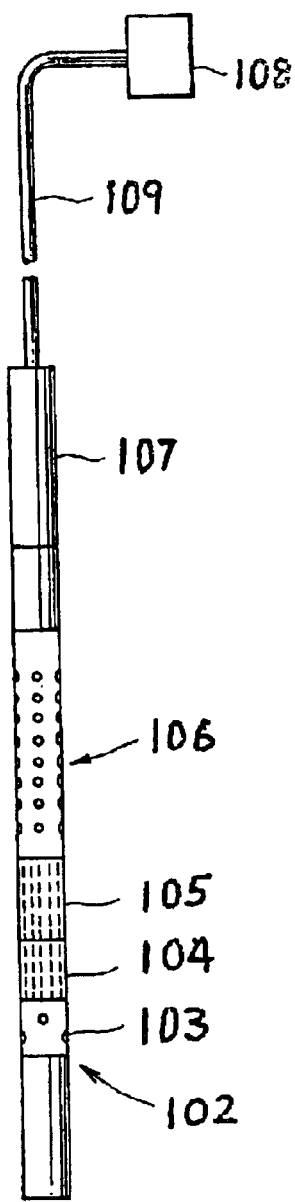
FIG. 1 shows a prior art sonic logging tool.
Figure 2:
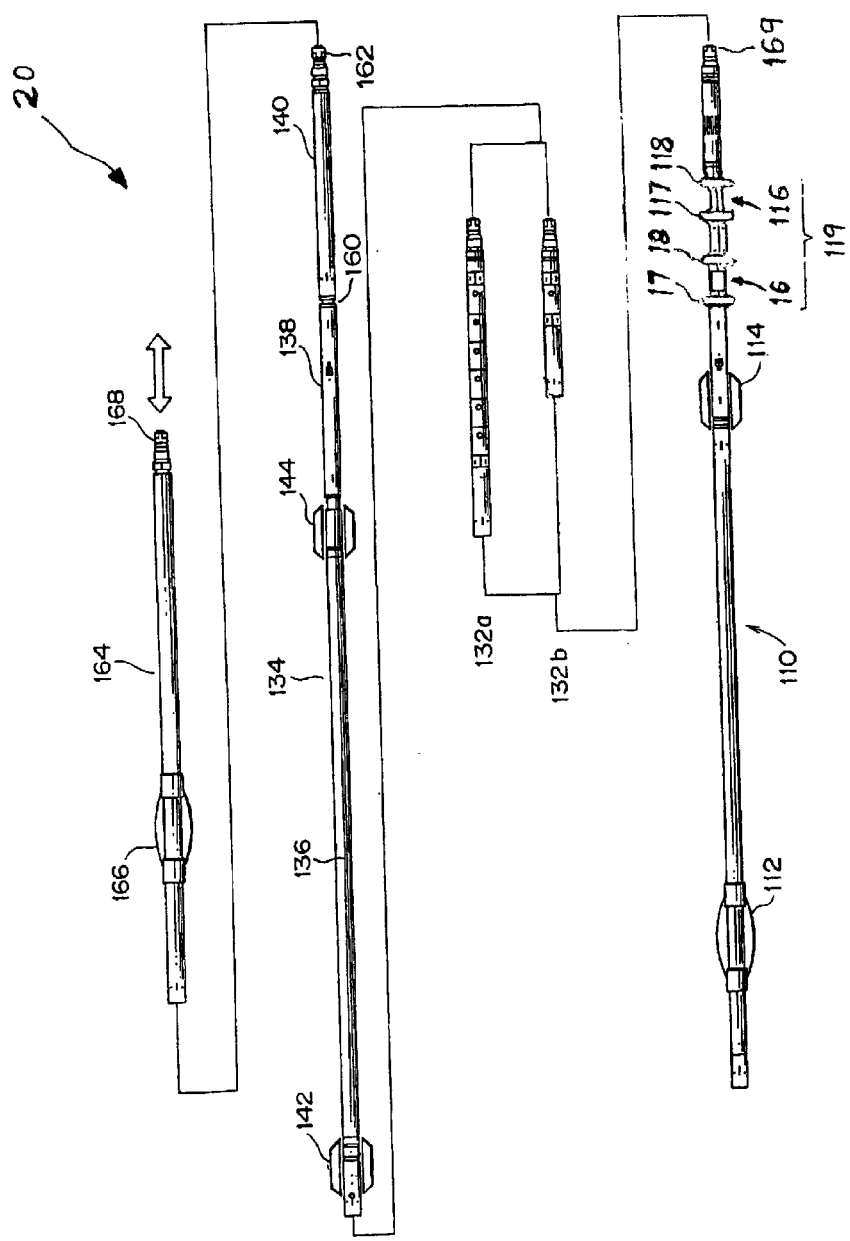
FIG. 2 shows a logging tool including a transmitter module having a dipole source with baffles forming an acoustic waveguide in accordance with a preferred embodiment of the invention.
Figure 3:
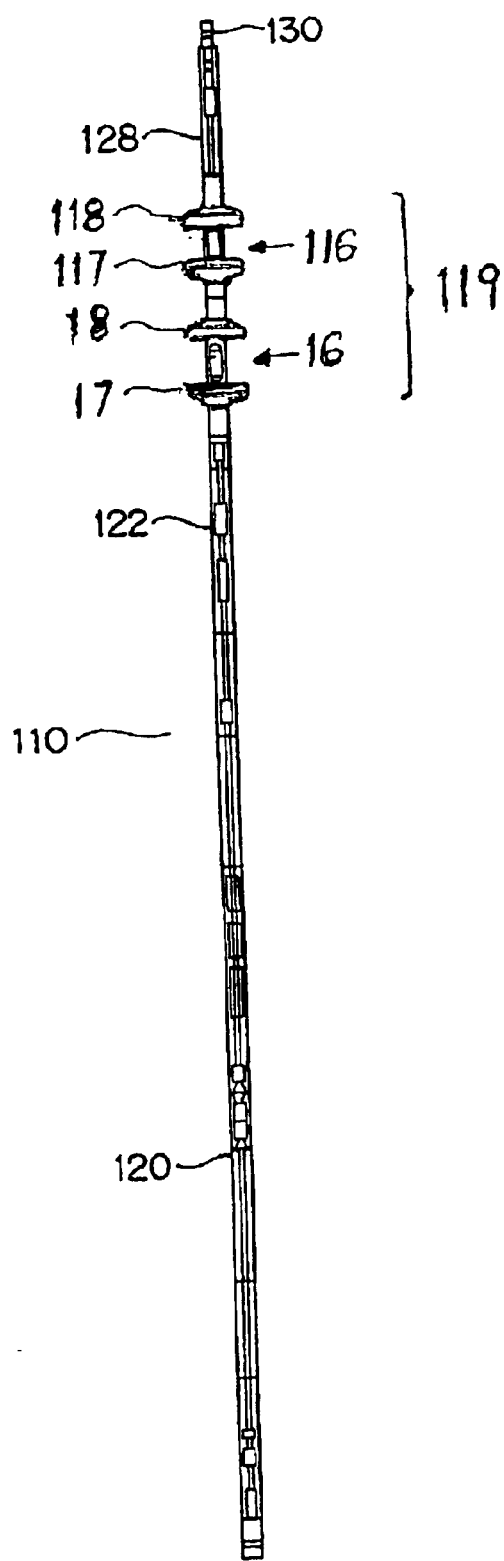
FIG. 3 shows a more detailed view of the transmitter module of FIG. 2.

FIG. 2 is a schematic illustration of a first preferred embodiment of an acoustic logging tool 20 in accordance with the invention. Tool 20 includes an acoustic transmitter module 110 including a centralizer 112, a standoff 114, a first dipole source 16 with a lower baffle 17 and an upper baffle 18, and a second dipole source 116 with a lower baffle 117 and an upper baffle 118. Transmitter module 110 is shown in more detail in FIG. 3 and comprises an electronics section 120 with appropriate electronics and drive circuitry for the acoustic sources, an oil volume compensator section 122, a first dipole source 16 (nominal "Y" direction), a second dipole source 116 (orthogonal to the first dipole source 16, nominal "X" direction) and a monopole source 128. The dipole sources 16, 116 are substantially as described in the applicants' co-pending U.S. patent application Ser. No. 09/537,836 entitled "Dipole Logging Tool", filed Mar. 29, 2000. U.S. patent application Ser. No. 09/537,836 is hereby incorporated herein by reference. U.S. patent application Ser. No. 09/537,836 is the priority application of the above-mentioned International Application no. PCT/IB01/00447, "Dipole Logging Tool" published as WO 01/73478 A2 on Oct. 4, 2001. The monopole source 128 is substantially as described in U.S. Pat. No. 5,036,945. U.S. Pat. No. 5,036,945 is hereby incorporated herein by reference.

Figures 4A, 4B, 4C:
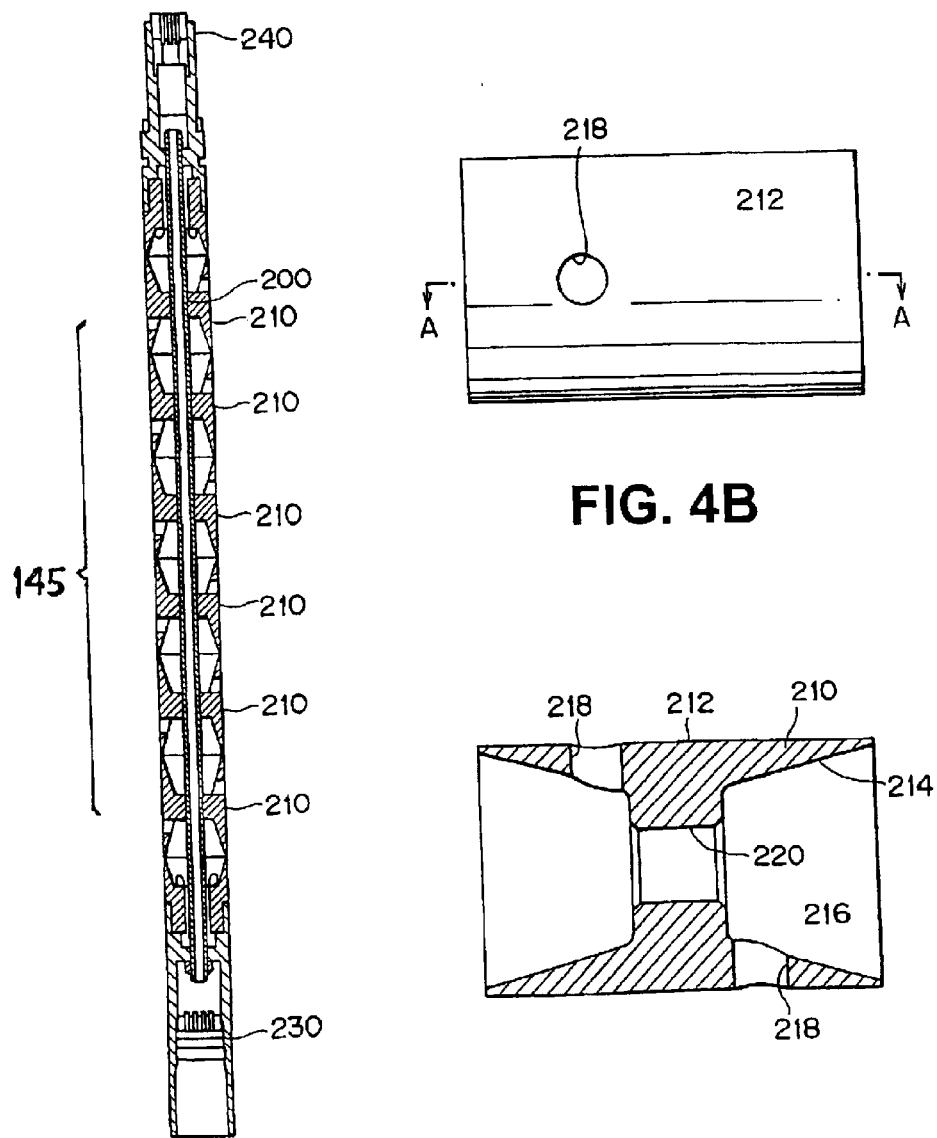
FIGS. 4A, 4B and 4C show more detailed views of a spacer section with mass blocks of the tool of FIG. 2.

A feed-through section 130 is provided to allow power and signaling wiring to be connected to the portion of the tool above the transmitter module 110. As shown in FIG. 2, connected immediately above the transmitter module 110 is a spacer section 132. Two options are shown in the FIG. 2, a long section 132a and a short section 132b. The length of the spacer section can be selected according to the expected acoustic behavior of the formation to be logged. The spacer section 132 is described in more detail in relation to FIGS. 4A, 4B and 4C, and comprises an inner mandrel 200 formed from a titanium alloy pipe having a series of stainless steel mass structures 210 comprising blocks with a cylindrical outer surface 212 and a shaped inner surface 214 defining a cavity 216 mounted securely at regular intervals along the length of the mandrel 200. The masses 210 are secured to the mandrel 200 by heating each mass 210 to cause it to expand and sliding it into place over the mandrel 200 using a bore 220 defined by the inner surface 214 of each mass 210. The mass 210 is then allowed to cool and shrink around the mandrel 200. By careful selection of the material and structure of the mandrel 200 and masses 210, and appropriate positioning of the masses 210 along the mandrel 200, the spacer can be configured to behave acoustically like a mass-spring structure which does not interfere with the acoustic signals used for evaluation of the formation surrounding the borehole, while still providing suitable physical structure and support for the other parts of the tool. Since there is no sleeve or housing around the spacer, and the mass blocks 210 are hollow and not sealed to each other, it is possible for borehole fluids to enter the cavity 216 in the mass blocks 210 and mud to build up inside the blocks and affect their acoustic behavior. In order to allow cleaning of the cavity 216, bores 218 are provided through cylindrical outer surface 212 of the blocks 210. The mandrel 200 is hollow and connected to feed-throughs 230, 240 at either end of the spacer section 132 such that wiring (not shown) can pass through the spacer 132 between the transmitter module 110 and the receiver sonde 134.

As noted above, the use of regularly spaced mass blocks in logging tools is disclosed in the above-mentioned international application number PCT/IB00/01696. International application number PCT/IB00/01696 is hereby incorporated herein by reference.

Figure 5:
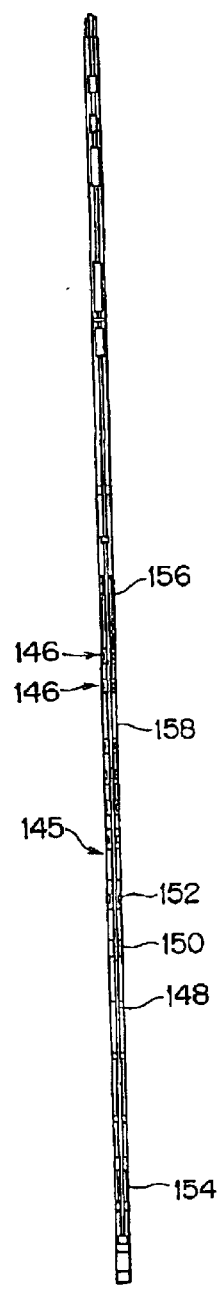
FIG. 5 shows a general view of the interior of the receiver sonde with mass blocks of the tool of FIG. 2.
Figure 6:
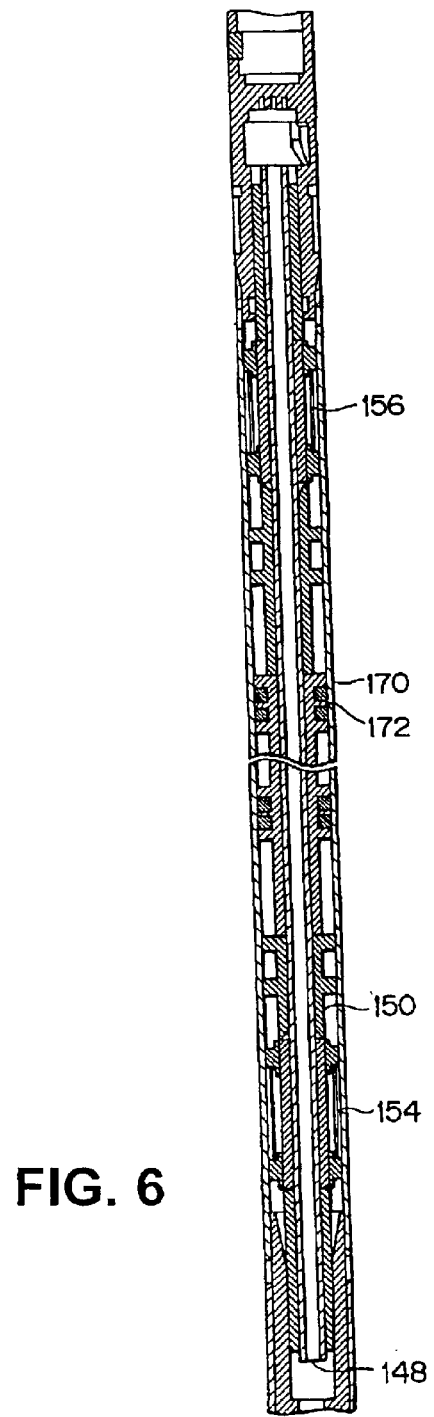
FIG. 6 shows a partial view of the physical elements of the receiver sonde.
Figure 7A:
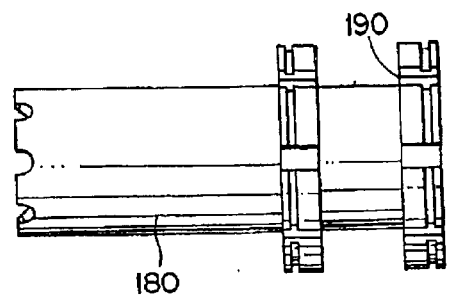
FIGS. 7A, 7B and 7C show side, cross-section, and isometric views of a mass block used in the receiver sonde.
Figure 7B:
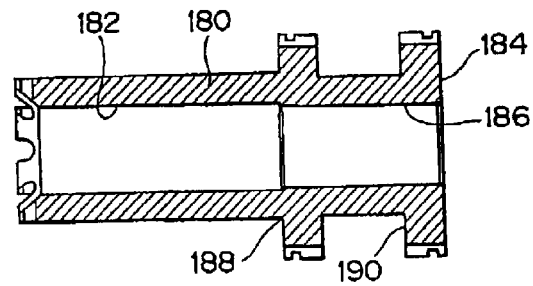
Figure 7C:
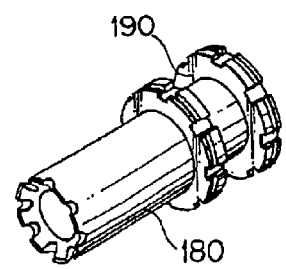

The top of the spacer section 132 is connected to a receiver sonde 134 comprising a receiver and near-monopole source region 136, an oil volume compensator 138 and a sonde electronics section 140, and which is provided with rubber standoffs 142, 144. A general view of the internal structure of the receiver sonde 134 is shown in FIG. 5. The receiver and near-monopole source region 136 of receiver sonde 134 comprises an array 145 of receiver stations 146 (16 in this example although other numbers are possible) spaced along a central mandrel 148, each station 146 comprising a receiver mounting block 150 connected to the mandrel 148 and having a number of sensing elements 152 (hydrophones) arranged equi-angularly around the circumference of the block 150. In the present case, eight elements 152 are provided but other numbers, e.g. four, can also be used. Front end electronics boards (not shown) are associated with each receiver station 146. Monopole sources 154, 156 are mounted at either end of the receiver array 145. The receiver and near-monopole source region 136 of receiver sonde 134 is encased in an armored sleeve 158 preferably made of a soft plastic material, and is filled with oil for pressure compensation. The oil volume compensator 138 is connected above the receiver and near-monopole source region 136 and connected to the interior thereof. The sonde electronics section 140 is connected above the oil volume compensator 138 and includes front end power supplies and step up transformers (not shown) for the monopole sources. Feed-throughs 160 are provided to allow wiring communication between the various sections of the sonde 134. The upper part of the sonde 134 is also provided with feed-throughs 162 for connection to a master electronics cartridge 164 which also has a centralizer 166. The cartridge 164 is provided with standard connectors 168 which allow connection to other tools in a logging tool string or to a telemetry cartridge which communicates with a surface system via a wireline logging cable (not shown).

The receiver sonde is shown in more detail in FIGS. 6, 7A–7C and 8. The basic structure of the receiver section 136 is a mandrel 148 and receiver-mounting mass block 150, an arrangement similar to that used in the spacer section. Monopole sources 154, 156, essentially the same as that described in relation to the transmitter module above, are provided at either end of the receiver section 136. The mandrel 148 extends between these sources 154, 156 and the series of mass blocks 150 are mounted on the mandrel 148 in the same way as in the spacer section. Sixteen adjacent blocks 150 define receiver mountings 170 each of which carries a circumferential array of sensing elements (hydrophones) 172 spaced around the periphery thereof. One diametrically opposed pair of elements in each station are aligned with a respective one of the dipole sources. In this embodiment, eight sensing elements 172 are provided. It will be appreciated that the number of stations and the number of receiver elements at each station can be selected according to requirements, for example, twelve stations, each with four receiver elements could be chosen.

Figure 8:
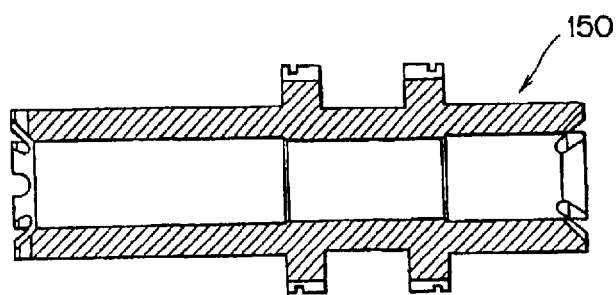
FIG. 8 shows a dummy block design that can be used to preserve the periodicity of the structure.

Receiver-mounting blocks 150 comprise a relatively elongated, tubular body 180 having a bore 182 extending through the middle. An end section 184 of the bore 182 has a region 186 of reduced diameter which embraces the outer surface of the mandrel 148. The outer part 188 of the block 150 is formed into a mounting cavity 190 for the sensing element 172. These forms, or other similar structures can be used to define the acoustic behavior of the receiver section, particularly in the flexural mode. Each block 150 is connected so that it does not contact the adjacent blocks directly. The only continuous structure in the receiver is the mandrel 148. Dummy blocks (such as shown in FIG. 8) can be provided at the ends of array 145 (shown in FIG. 5) to ensure consistent acoustic behavior of the structure near the ends of the array.

The sensing element 172 is preferably a piezoelectric pressure sensor. The preferred form of sensor comprises a piezoelectric cylinder with end caps connected by a screw extending through the cylinder. Another form of sensor is a polarized stack of piezoelectric plates. These can be in the form of a stack with a screw extending through the center of the stack to compress the plates. Alternatively, the plates can be located in a housing and separated from each other by electrodes to maximize the pressure effect on the plates. Whichever form of sensor is used, it is preferred that the axis of polarization is parallel to the longitudinal axis of the tool. The exact manner in which the sensing element 172 is mounted in the block 150 will depend upon the form of the sensing element used.

Figure 9:
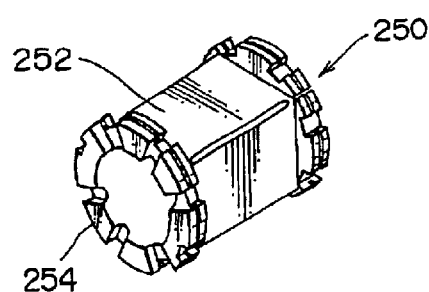
FIG. 9 shows a mounting for a printed circuit board.

Front end electronics are mounted on circuit boards (not shown) located on mountings 250 (see FIG. 9) positioned around the outer part of each block 150, one set of boards on a mounting 250 being associated with each receiver station. The mountings 250 comprise four surfaces 252 located between circular end fittings 254 which fit over block 150. The outer diameter of the end fittings is substantially the same as that of the mounting cavity 190.

Figure 10:
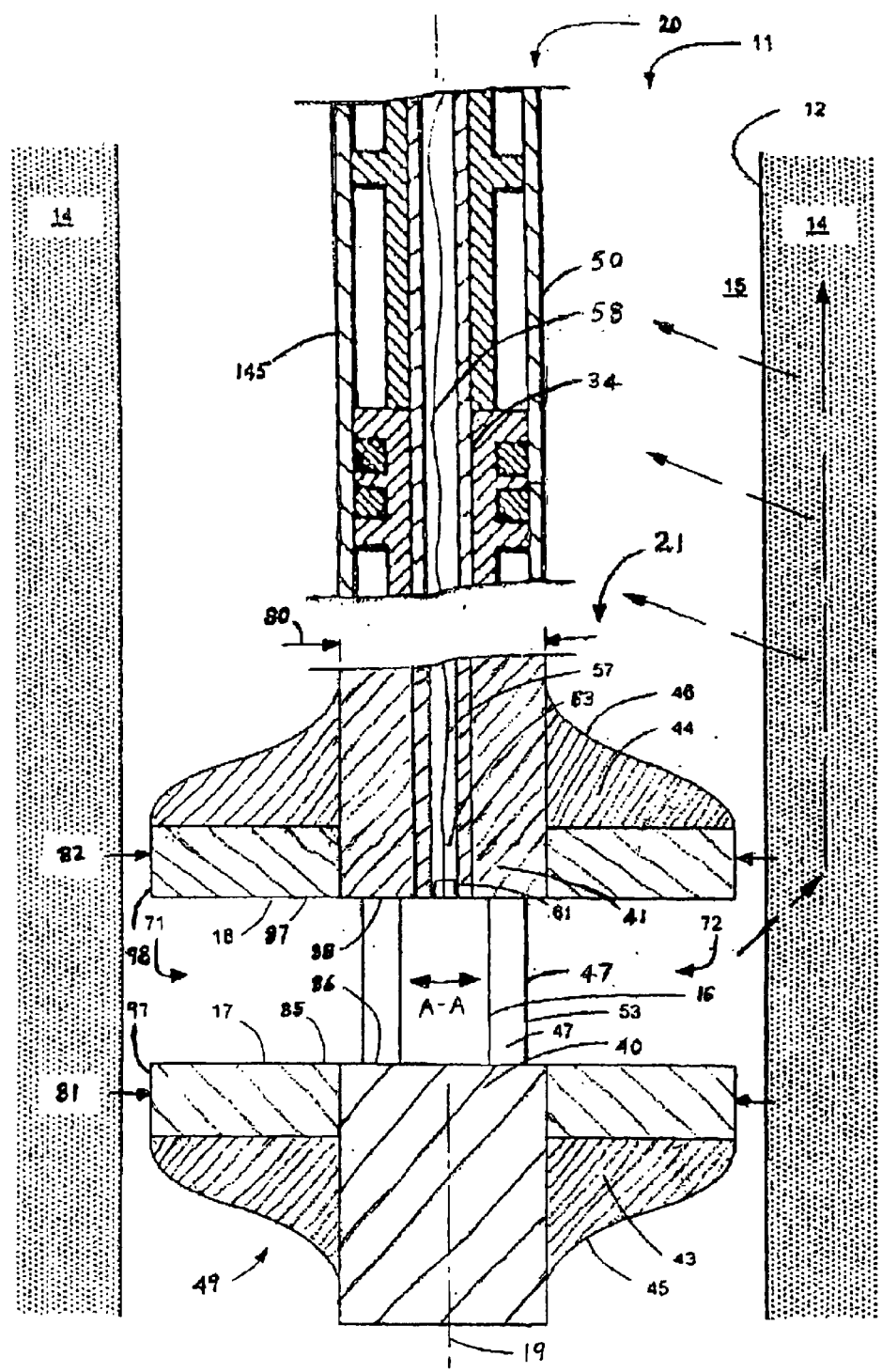
FIG. 10 is a detailed schematic illustration of a portion of a first preferred embodiment of a logging tool with a transmitter module having a dipole source with baffles forming an acoustic waveguide.

FIG. 10 shows a schematic cut-away view of a portion of the first preferred embodiment of FIG. 2, including the portion of the dipole source region 119 that includes lower dipole source 16, lower baffle 17 and upper baffle 18. FIG. 10 shows tool 20 in borehole 11. Tool 20 includes transmitter module 21 and receiver sonde 50 with receiver array 145. Transmitter module 21 defines axis 19 and the cylindrical outer surface 80 that defines the diameter of the body of transmitter module 21. Transmitter module 21 further includes a dipole source 16 (also shown in FIGS. 11A, 11B and 12), an array 145 of acoustic receivers, an annular lower baffle 17 and an annular upper baffle 18. Lower baffle 17 and upper baffle 18 define annular facing surfaces 85 and 87, respectively. The upper end of lower cylindrical mass 40 and the lower end of upper cylindrical mass 41 define facing surfaces 86 and 88, respectively. Facing surfaces 85 and 86 below and 87 and 88 above define a waveguide structure including first-side waveguide 71 and second-side waveguide 72. Lower baffle 17 and upper baffle 18 define outer cylindrical surfaces 97 and 98, respectively.

Lower baffle 17, lower cylindrical mass 40, and lower protective ring 43 constitute baffle assembly 49. This baffle assembly is preferably constructed by shrink-fitting lower baffle 17 and lower protective ring 43 onto lower cylindrical mass 40. Alternatively, it may be cast and machined as one piece for unitary construction.

Figure 11A:
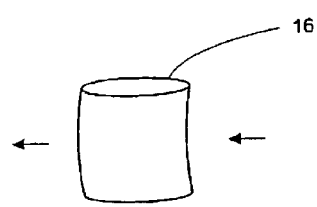
FIGS. 11A and 11B illustrate vibration in the dipole mode.
Figure 11B:
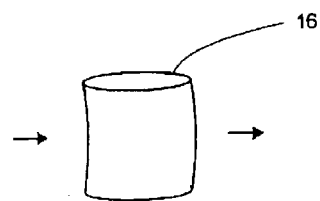

Dipole source 16 vibrates in the direction of arrows A—A, as illustrated in FIGS. 10, 11A and 11B. FIG. 10 shows dipole source 16 transmitting dipole acoustic energy via first-side waveguide 71 and second-side waveguide 72 towards opposite sides of borehole wall 12. The acoustic energy creates dipole flexural waves in opposite sides of earth formation 14. Some of these waves, as illustrated by the dashed lines with arrowheads starting at second-side waveguide 72, travel up formation 14, substantially parallel to the borehole wall 12, to cross again into the borehole where acoustic energy is detected at the receivers of receiver array 145.

Figure 12:
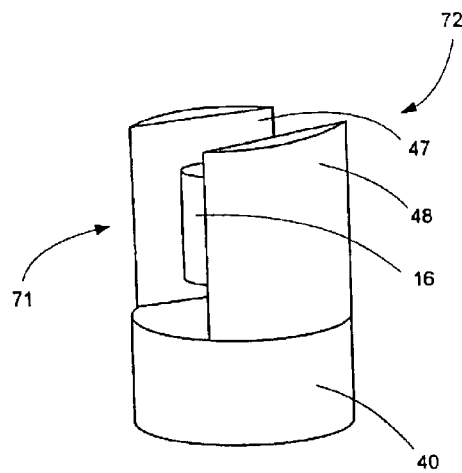
FIG. 12 is a perspective view of the lower cylindrical mass, the dipole source, and the two spacers of the first preferred embodiment adapted for use in dipole mode.

First spacer 47 and second spacer 48 define the distance between facing surfaces 86 and 88. (Only the first spacer 47 is shown in FIG. 10). FIG. 12 shows both spacers in perspective view, each spacer preferably has the shape of a section of a cylinder. Spacers 47 and 48 fixedly attach upper surface 86 of lower cylindrical mass 40 to lower surface 88 of upper cylindrical mass 41. Spacers 47 and 48 define the distance between lower baffle 17 and upper baffle 18.

Lower baffle 17 is a rigid massive structure that is shown in FIG. 10 as shrink-fit onto lower cylindrical mass 40. Lower baffle 17 is protected and stiffened by lower protective ring 43. Lower protective ring 43 is also shown shrink-fit onto lower cylindrical mass 40. Upper baffle 18 is a rigid massive structure that is shown in FIG. 10 as shrink-fit onto upper cylindrical mass 41. Upper baffle 18 is protected and stiffened by upper protective ring 44. Upper protective ring 44 is also shown shrink-fit onto upper cylindrical mass 41.

In the preferred embodiment each baffle is preferably formed as one piece with its associated protective ring. Each protective ring is preferably shaped to present a smooth transition at the borehole wall. Lower protective ring 43 defines lower shaped surface 45. Likewise, upper protective ring 44 defines upper shaped surface 46.

FIG. 10 shows baffles 17 and 18, one spacer 47, and dipole source 16. This illustrates how baffles 17 and 18 and the two spacers 47 and 48 partially enclose dipole source 16. FIG. 12 is a perspective view of lower cylindrical mass 40, spacers 47 and 48, and dipole source 16 of the first preferred embodiment adapted for use in dipole mode. (Baffles 17 and 18 are not shown in FIG. 12 for clarity of illustration).

The baffles and the spacers act as a waveguide structure defining a pair of waveguides that may be viewed as a first-side waveguide 71 and a second-side waveguide 72. As illustrated in FIGS. 10 and 12, each of waveguides 71 and 72 has an inner region of substantially rectangular cross-section. The region is bounded at its sides by inner faces of spacers 47 and 48. It is bounded below by the flat face of lower cylindrical mass 40. It is bounded above by the flat lower end of upper cylindrical mass 41 (not shown in FIG. 12). As illustrated in FIG. 10, each of waveguides 71 and 72 has an outer region that is bounded below by lower baffle 17 and above by upper baffle 18, but is unbounded on its sides. Each waveguide effectively focuses acoustic energy onto an annular area on its side of the borehole wall with limited azimuthal dispersion by effect of the inner faces of spacers 47 and 48, and with limited axial dispersion by effect of the lower and upper baffles 17 and 18. Each waveguide channels acoustic energy that is radiated by dipole source 16 vibrating as illustrated in FIGS. 11A and 11B.

FIG. 10 shows dipole source 16 coupled electrically to transmitter control electronics (not shown) via electrical wiring 57 and electrical wiring 58 (carried within flexible cable armor 56). The electrical wiring passes through first electrical coupler 61 (shown in FIG. 10), and the several connectors 169, etc. (shown in FIG. 2).

Figure 13A:
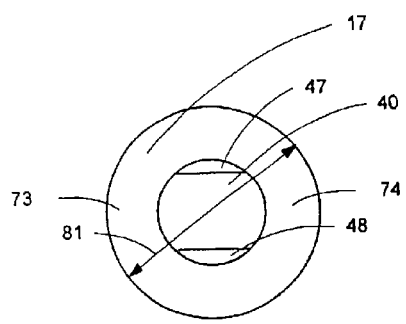
FIGS. 13A–13C show alternative baffle shapes.

In the first preferred embodiment, each baffle has an annular shape and a cylindrical outer surface. FIG. 13A is a plan view of lower baffle 17 of the preferred embodiment surrounding the structure of FIG. 12, with dipole source 16 not shown. FIG. 13A shows lower cylindrical mass 40 and first and second spacers 47 and 48. First region 73 of lower baffle 17 corresponds to first-side waveguide 71 in FIG. 10. Second region 74 of lower baffle 17 corresponds to second-side waveguide 72 in FIG. 10. The diameter of lower baffle 17 is indicated by double arrow 81.

Figure 13B:
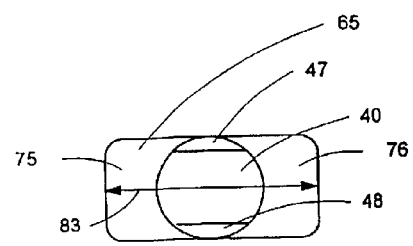

A first alternative baffle shape is shown in FIG. 13B. FIG. 13B is a plan view of lower baffle 65 of the first alternative embodiment, including lower cylindrical mass 40. First region 75 of lower baffle 65 corresponds to first-side waveguide 71 in FIG. 10. Second region 76 of lower baffle 65 corresponds to second-side waveguide 72 in FIG. 10. The effective diameter of lower baffle 65 is indicated by double arrow 83.

Figure 13C:
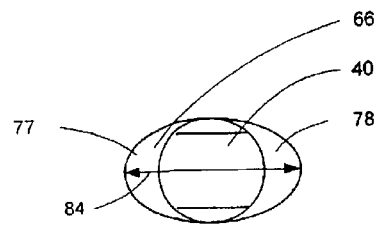

A second alternative baffle shape is shown in FIG. 13C. FIG. 13C is a plan view of lower baffle 66 of the second alternative embodiment, including lower cylindrical mass 40. First region 77 of lower baffle 66 corresponds to first-side waveguide 71 in FIG. 10. Second region 78 of lower baffle 66 corresponds to second-side waveguide 72 in FIG. 10. The effective diameter of baffle 66 is indicated by double arrow 84.

Another alternative embodiment (not shown) of present invention includes a transmitter mount in accordance with U.S. Pat. No. 5,036,945 modified to add baffles as disclosed herein. U.S. Pat. No. 5,036,945, "Sonic Well Tool Transmitter Receiver Array including an Attenuation and Delay Apparatus", issued Aug. 18, 1998, to Hoyle, et al., discloses a transmitter mount without baffles. In particular, see FIGS. 4, 4 C, and 4 D of U.S. Pat. No. 5,036,945.

Figure 14:
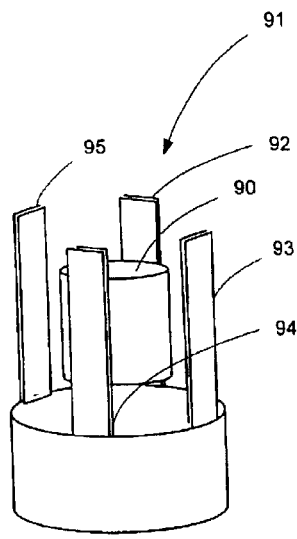
FIG. 14 shows four spacers in an embodiment of an acoustic logging tool adapted for use in quadrupole mode.

FIG. 14 shows a portion of an embodiment of quadrupole transmitter mount 91 partially enclosing quadrupole source 90. When used with baffles in accordance with the invention, transmitter mount 91 may be seen as providing four waveguides, defined by the four spacers 92–95, for use with a quadrupole source. Other multi-pole transmitter mounts may be constructed in similar manner.

Figure 15:
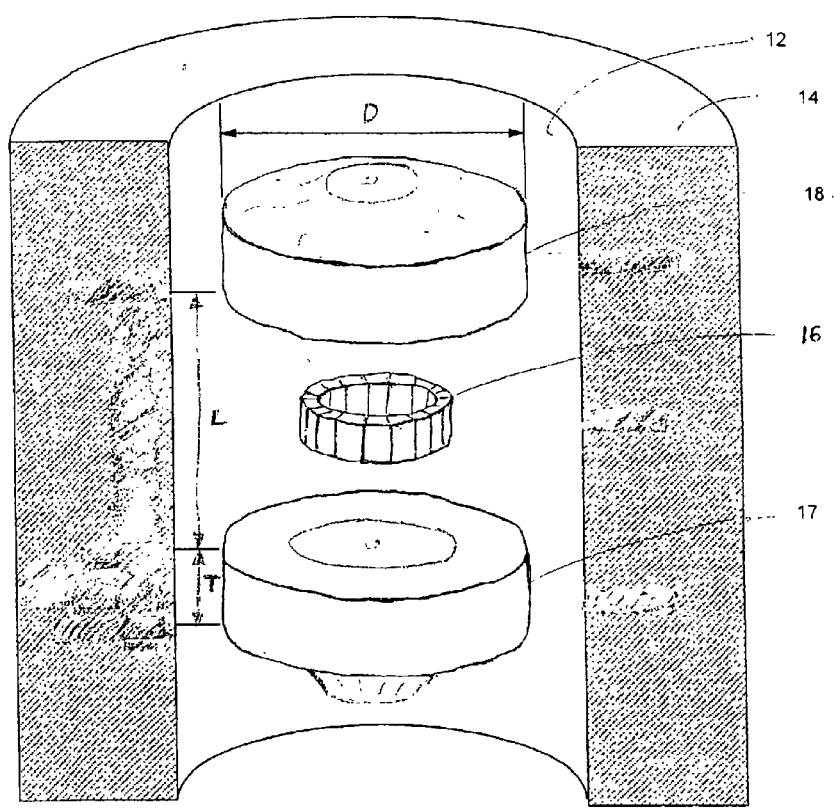
FIG. 15 is a perspective, partial cross section, schematic illustration of the dipole source with baffles and the acoustic waveguide of the embodiment shown in FIG. 10.

FIG. 15 is a perspective, partial cross-section illustration of a wireline tool having a dipole source and baffles in accordance with the invention. The main performance characteristic (amplification ratio) of a given design was found to be determined largely by three design dimensions. The three design dimensions are baffle thickness "T"; baffle diameter "D"; and edge to edge distance between the two baffles "L", as illustrated in FIG. 15.

Amplification ratio as a function of each of these dimensions was calculated using a finite difference code. The schematic illustration of FIG. 15 shows a dipole source 16 with baffles in accordance with the invention. Lower baffle 17 and upper baffle 18 are located within borehole wall 12 and earth formation 14.

In the computer simulation used to produce the data graphed in FIGS. 17A–19B, the mathematical model for dipole source 16 represented a piezoelectric ring. The mathematical model for lower and upper baffles represented steel blocks. The mathematical model for the 8.5 inch diameter borehole 12 and formation 14 represented a set of formation physical parameters. The physical parameters were shear slowness (dts=600 $\mu$ second/foot), compressional slowness (dtc=160 $\mu$ second/foot), and mass density ($\rho$=2 gram/cm$^3$). The central frequency of the excitation function was 2.5 KHz.

Experimental Results

The inventors modeled the structure described above, simulating acoustic excitation, and calculating parameters using Finite Differences Code to show the benefits of the invention. Experimental data based on computer simulation shows that using a pair of rigid heavy blocks above and below the dipole source of a sonic logging tool will result in a significant increase in the amplitude of borehole flexural signals reaching the tool receivers. The blocks and baffles serve as waveguides that focus acoustic energy from the dipole source onto opposite annular areas of the borehole surface. Without this structure, the dipole source radiates energy more broadly, so a significant proportion of the available energy is absorbed by the borehole fluid and by the tool body. The denser, the stiffer, and the larger the blocks and baffles, the larger the increase in amplitude at the receivers. Based on the numerical results, a six times amplification can be achieved with reasonably sized baffles (3 inch thick and 8 inch diameter) in an 8.5 inch diameter borehole in a slow formation (600 $\mu$s/ft shear slowness).

Effect of Block Thickness

Figure 16A:
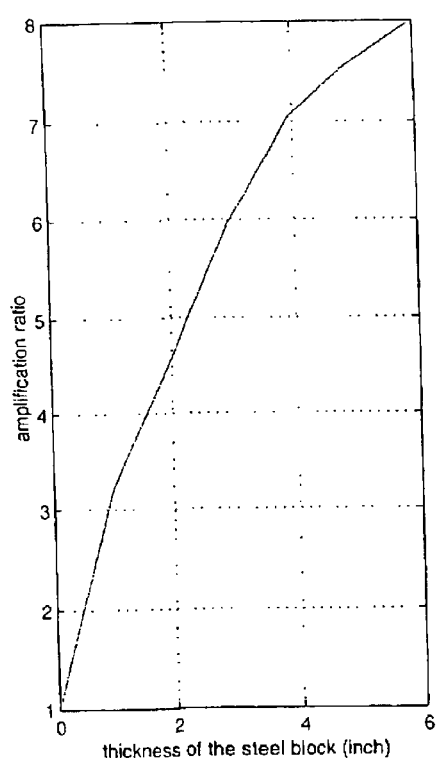
FIGS. 16A and 16B are graphs, based on test data from computer modeling, showing the effect on amplification of baffle thickness.
Figure 16B:
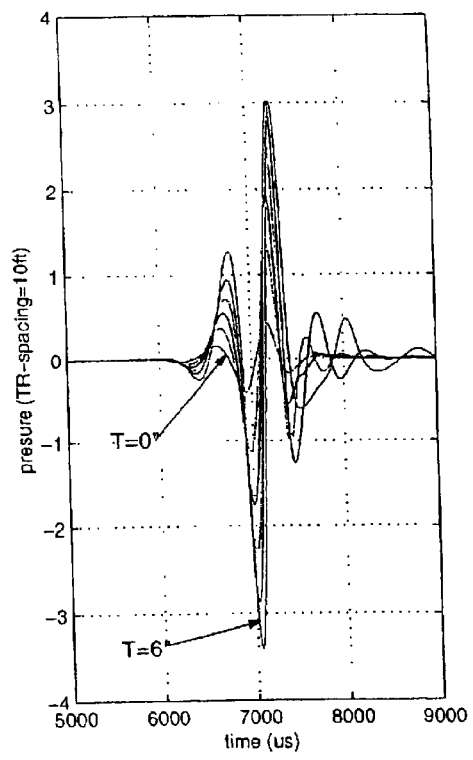

To determine the effect of the block thickness, block diameter D was set equal to 8 inch (20 cm) and the distance L between the blocks was set to 3 cm (1.18 inch). Block thickness T of the blocks was gradually changed from 0 inch to 6 inch (0 to 15 cm), and dipole flexural waveforms at the first tool receiver location were calculated. FIG. 16A is a graph showing amplification ratio as a function of the block thickness. Amplification ratio is defined as (peak value of pressure waveform with the blocks) divided by (peak value of pressure waveform without the blocks). FIG. 16A shows that as the block thickness increased from 0 inch to 6 inch (0 to 15 cm), the amplitude ratio increased from 1 to 8. FIG. 16B shows that there were no significant changes in the shape of the waveform. This suggests that the blocks do not alter the waveform quality to any significant degree.

Effect of Block Diameter

Figure 17A:
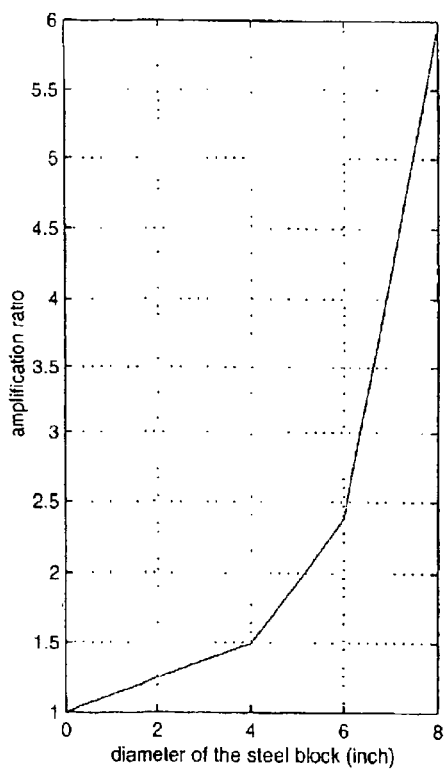
FIGS. 17A and 17B are graphs, based on test data from computer modeling, showing the effect on amplification of baffle radius.
Figure 17B:
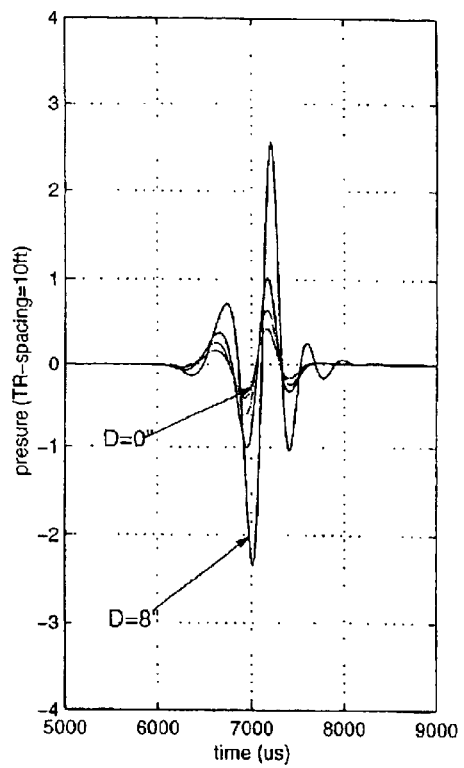

To determine the effect of the block diameter, block thickness T was set to 3 inch and the distance L between the blocks was set to 3 cm (1.18 inch). Block diameter D was changed gradually from 0 inch to 8 inch (0 to 20 cm) and dipole flexural waveforms were calculated. FIG. 17A is a graph showing amplification ratio as a function of the block diameter. FIG. 17A shows that as the block diameter increased from 0 inch to 8 inch, the amplitude ratio increased from 1 to 6. FIG. 17B shows that there were no significant changes in the shape of the waveform. From FIGS. 18A and 18B, it can be seen that amplification ratio is more sensitive to changes in block diameter than to changes in block thickness.

Effect of Distance between Blocks

Figure 18A:
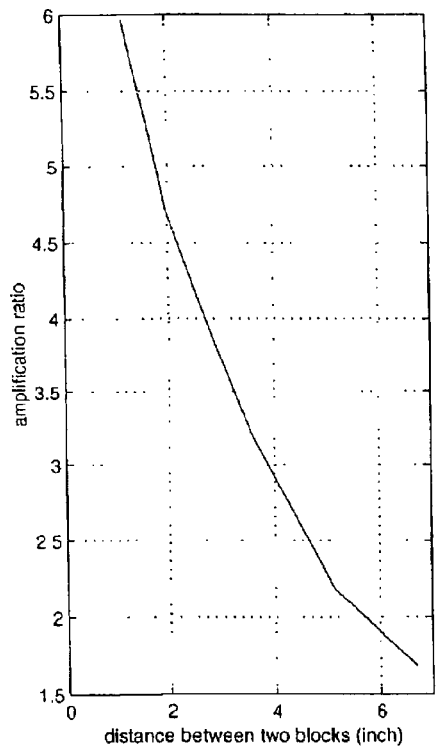
FIGS. 18A and 18B are graphs, based on test data from computer modeling, showing the effect on amplification of the distance between upper and lower baffles.
Figure 18B:
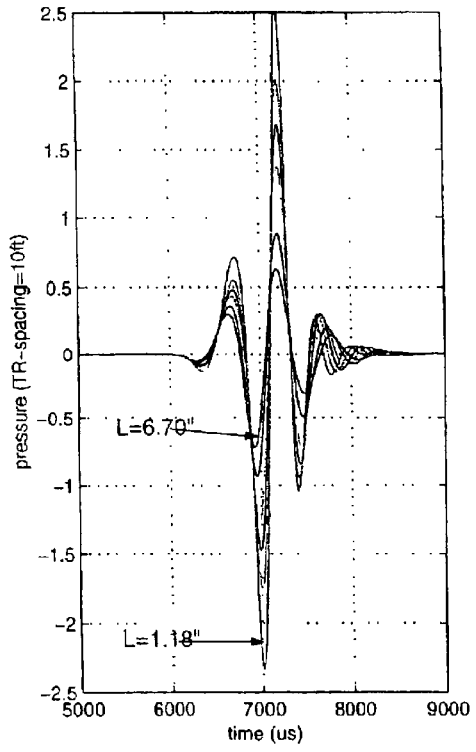

To determine the effect of distance between blocks, block thickness T was set to 3 inch (7.6 cm) and block diameter D was set to 8 inch (20 cm). Block distance L was changed gradually from 1.18 inch to 6.7 inch (3 cm to 17 cm) and dipole flexural waveforms were calculated. FIG. 18A is a graph showing amplification ratio as a function of the distance between blocks. FIG. 18A shows that as the distance between blocks increased from 1.18 inch to 6.7 inch, the amplitude ratio decreased from 6 to 1.7. The waveforms are shown in FIG. 18B.

What is claimed is:

1. An acoustic logging tool, comprising:
   an elongated transmitter module defining a transmitter module axis; and
   a receiver sonde including a linear array of acoustic receivers, said a receiver sonde coupled to and spaced apart from said transmitter module;
   wherein said transmitter module includes
   first and second cylindrical masses spaced apart along said axis by first and second spacers, said first cylindrical mass defining a first circular facing surface and a first cylindrical outer surface, said second cylindrical mass defining a second circular facing surface and a second cylindrical outer surface;
   a multi-pole acoustic source fixedly mounted between said first and second circular facing surfaces, and located on said axis between said first and second spacers;
   a first annular baffle assembly surrounding said outer surface having a first annular facing surface co-planar with said first circular facing surface; and
   a second annular baffle assembly surrounding said outer surface having a second annular facing surface co-planar with said second circular facing surface; and
   wherein said first and second annular facing surfaces form an acoustic waveguide.

2. A logging tool according to claim 1, wherein at least one of said first and second annular baffle assemblies includes a baffle and a protective ring.

3. A logging tool according to claim 1, wherein at least one of said first and second annular baffle assemblies is a baffle.

4. A logging tool according to claim 3 wherein said protective ring has a shaped surface with an approximately conical cross section.

5. A logging tool according to claim 1, wherein at least one of said annular baffle assemblies has a cylindrical outer surface.

6. A logging tool according to claim 1, wherein said acoustic source is a dipole source.

7. A logging tool according to claim 1, wherein at least one of said annular baffle assemblies is elongated in a direction transverse to the tool axis.

8. A logging tool according to claim 1, wherein each receiver of said linear array of acoustic receivers is mounted to a mass block of a linear array of mass blocks.

9. A logging tool according to claim 1, wherein said multi-pole acoustic source is a quadrupole source.

10. In an acoustic logging tool having a transmitter module with first and second masses axially-aligned and bracketing a multi-pole acoustic source between circular facing surfaces, an acoustic waveguide comprising first and second annular baffle assemblies encircling said first and second masses, respectively; said first and second baffle assemblies having first and second annular facing surfaces co-planar, respectively, with said first and second circular facing surfaces.

11. An acoustic waveguide according to claim 10, wherein said multi-pole acoustic source is a dipole source.

12. An acoustic waveguide according to claim 10, wherein at least one assembly includes a protective ring.

13. An acoustic waveguide according to claim 12, wherein said protective ring has a shaped peripheral surface with an approximately conical cross section.

14. An acoustic waveguide according to claim 10, wherein at least one baffle assembly is shrink-fit to a mass.

15. An acoustic waveguide according to claim 10, wherein at least one baffle assembly is of unitary construction.

16. An acoustic waveguide according to claim 10, wherein said multi-pole acoustic source is a quadrupole source.

17. An acoustic waveguide according to claim 10, wherein at least one baffle assembly has a cylindrical outer surface.

18. An acoustic waveguide according to claim 10, wherein at least one baffle assembly has an outer surface that is elongated in a direction transverse to the transmitter axis.

* * * * *